United States Patent [19]

Haase et al.

[11] 4,120,938
[45] * Oct. 17, 1978

[54] AQUEOUS SOLUTIONS OF ALKALI POLYSILICATES

[75] Inventors: Rainer Haase, Bokel, Schleswig, Holstein; Volker Hunger, Rheidt; Arnold Lenz, Cologne-Stammheim, all of Germany

[73] Assignee: Dynamit Nobel Aktiengesellschaft, Troisdorf, Germany

[*] Notice: The portion of the term of this patent subsequent to Oct. 5, 1993, has been disclaimed.

[21] Appl. No.: 748,603

[22] Filed: Jul. 8, 1976

Related U.S. Application Data

[62] Division of Ser. No. 496,778, Aug. 12, 1974, Pat. No. 3,984,526.

[30] Foreign Application Priority Data

Aug. 25, 1973 [DE] Fed. Rep. of Germany ....... 2343026

[51] Int. Cl.$^2$ .............................................. C01B 33/32
[52] U.S. Cl. ........................................ 423/332; 106/74
[58] Field of Search ................. 423/332; 106/74, 84

[56] References Cited

U.S. PATENT DOCUMENTS

| | | | |
|---|---|---|---|
| 3,180,747 | 4/1965 | Patton et al. | 423/332 X |
| 3,392,039 | 7/1968 | Cuneo | 106/84 |
| 3,459,500 | 8/1969 | Segura et al. | 423/332 |
| 3,984,526 | 10/1976 | Haase et al. | 423/332 |

FOREIGN PATENT DOCUMENTS 1,183,120  3/1970  United Kingdom ............ 423/332

OTHER PUBLICATIONS

Aelion et al., "J. Am. Chem. Soc.", vol. 72, 1950, pp. 5705–5712.

*Primary Examiner*—Edward J. Meros
*Attorney, Agent, or Firm*—Burgess, Dinklage & Sprung

[57] ABSTRACT

A process for the preparation of an aqueous alkali metal polysilicate solution having an $SiO_2$ : alkali metal oxide mole ratio of 2.5 – 5.5 : 1 and a silica content of 16 – 23% by weight which comprises contacting a tetraalkoxysilane of the formula $Si(OR)_4$ wherein each R is independently a straight or branched-chain alkyl group of 1 to 3 carbon atoms with an aqueous alkali metal hydroxide solution at a temperature between room temperature and the boiling point of the reaction mixture and at a temperature up to 100° C. distilling over alcohol formed by the reaction of the silane with the alkali metal hydroxide.

5 Claims, No Drawings

AQUEOUS SOLUTIONS OF ALKALI POLYSILICATES

This is a division of application Ser. No. 496,778, filed Aug. 12, 1974, now U.S. Pat. No. 3,984,526.

BACKGROUND OF THE INVENTION

1. Field of the Invention

This invention relates to the preparation of alkali metal polysilicate solutions, particularly alkali metal polysilicate solutions having a high silica to alkali metal oxide content, say, a silica to alkali metal oxide mole ratio of 2.5 to 5.5:1. This invention is particularly directed to the preparation of lithium polysilicate solutions and especially lithium polysilicate solutions having a high silica to lithium oxide mole ratio. This invention is particularly directed to a simple and relatively commercially feasible process for the preparation of these high silica-containing alkali metal polysilicate solutions.

DISCUSSION OF THE PRIOR ART

Sodium and potassium polysilicate solutions, also known as water glasses, are obtained by melting quartz sand with soda or potash and then dissolving the melt with water under pressure. In this process not only the high expenditure of energy and the high cost of the apparatus are disadvantageous, but also the fact that solutions are obtained in which the maximum molar ratio of $SiO_2$ to $Na_2O$ or $SiO_2$ to $K_2O$ can be no more than about 3.9 to 1. In the applications of polysilicate solutions, however, molar ratios are desired ranging between 4:1 and 5:1, and therefore this prior art process is not suitable for the preparation of particularly desirable polysilicate solutions.

Lithium polysilicate solutions having this molar ratio and a lower one cannot, however, be prepared in the manner described above, because in this process it is mainly metasilicate and disilicate that form, which are poorly soluble in water. Lithium polysilicate is therefore generally prepared by reacting an amorphous $SiO_2$ with aqueous LiOH solution. Only if special reaction conditions are precisely maintained does this reaction result in a polysilicate solution. By-products which form very easily are disilicates and metasilicates or even insoluble hydrous silicates of various composition which are insoluble in the reaction mixture. These lithium silicates must therefore be filtered out of the solution in a separate procedure, which often entails complications on account of the high alkalinity and the high viscosity of the solutions.

Several methods have been proposed for circumventing these complications, such as for example operating at elevated temperature with the application of pressure, or with the maintenance of certain stirring speeds, or the hot filtration of the polysilicates which are insoluble at elevated temperatures and dissolve again upon the cooling of the precipitate. These procedures, however, require additional investment in apparatus and do not solve the problem of the additional production of lithium silicates which are insoluble in water, so that a refining filtration is always additionally required as the final procedure.

In these above-named processes, another disadvantage is that one must start out with an amorphous, porous $SiO_2$ which first has to be produced in a separate process involving a number of steps. An amorphous but solid $SiO_2$, such as is present, for example, in quartz glass, is unsuitable for this process.

Lithium polysilicate solutions may be prepared from $SiO_2$ sols by adding a solution of LiOH to them. Two methods of procedure are possible: either an $SiO_2$ sol stabilized with $Na^+$ ions or $K^+$ ions is reacted with the LiOH solution to produce a lithium polysilicate contaminated by these alkali ions, or an alkali-ion-free $SiO_2$ sol is used which is obtained by passing an $SiO_2$ sol containing alkali ions through an ion exchanger. Both procedures have disadvantages: either an impure lithium polysilicate is obtained, or an additional investment in apparatus is required on the basis of the treatment with the ion exchanger.

It is, therefore, an object of the present invention to provide a simple and inexpensive process for the preparation of sodium and potassium polysilicate solutions, especially those solutions having a silica to sodium oxide or potassium oxide mole ratio greater than 3.9:1. Another object of the present invention is to provide a process for the preparation of lithium polysilicate solutions wherein the lithium polysilicate solutions are substantially free of extraneous alkali metal ions such as sodium ions and potassium ions. It is another object of the present invention to provide a process for the preparation of such polysilicate solutions which process can be performed in the absence of elevated pressure. It is still a further object of the present invention to provide a process for the preparation of alkali metal polysilicate solutions using as a source of silica and oxygen a tetraalkoxysilane.

SUMMARY OF THE INVENTION

The objects of the present invention are provided in a process for the preparation of an aqueous alkali metal polysilicate solution having a silica:alkali metal oxide mole ratio of 2.5–5.5:1 with a silica content of 16–23% by weight which process comprises contacting a tetralkoxysilane of the formula $Si(OR)_4$ wherein each R is independently a straight or branched-chain alkyl group of 1 to 3 carbon atoms with an aqueous alkali metal hydroxide solution. The process is conducted by contacting the tetraalkoxysilane with the aqueous alkali metal hydroxide solution at a temperature between room temperature and the boiling point of the reaction mixture. At a temperature up to 100° C. distillation of alcohol so formed by the reaction is effected whereby to provide an alkali metal polysilicate solution having a high silica content.

It has been found in accordance with the present invention that such high silica containing aqueous alkali polysilicate solutions can be provided by a simple process in which the source of silica is a tetraalkoxysilane wherein the alkyl radical of the alkoxy group has 1 to 3 carbon atoms therein. By using such a source of silica there is formed during the process an alcohol which can be readily removed from the reaction mixture by distillation. By continuously distilling over the alcohol so formed during the reaction the equilibria of the reaction favors the preparation of high silica-containing aqueous alkali polysilicate solutions.

The process is conducted bearing in mind the desired silica content of the final alkali metal polysilicate solution. Since water can be removed during the distillation to remove the alcohol care is taken to replenish and/or adjust the water content in response to the loss of water during the distillation.

Thus, normally the process is performed by adding water during or after the distillation such that the final solution has the desired solids content. Thereafter, the same is cooled with stirring.

By carrying out the process above-described there can readily be prepared alkali metal polysilicates having a silica to alkali metal oxide mole ratio greater than 2.5:1, especially such polysilicate solutions having a silica to alkali metal oxide mole ratio of 4–5:1, most especially polysilicate solutions having a silica to alkali metal oxide mole ratio of 4.5–4.8:1. These latter silica containing solutions can have a silica content of between 20 and 22% by weight rendering them particularly useful in the preparation of silicaceous material including synthetic catalysts and as flame-proofing agents for wood and paper.

There can also be prepared by the described technique high silica-containing lithium polysilicate solutions. These lithium containing polysilicate solutions perferably have a silica to lithium oxide mole ratio of between 4.2:1 and 4.8:1. Such a polysilicate solution is particularly useful in the binder component of a zinc dust coating composition. These lithium polysilicate solutions have less than 50 parts per million of sodium or potassium ions when the mole ratio of silica to lithium oxide is 4–5 and the silica content is between 20 and 22% by weight.

An additional and further advantage of the present invention is that by using a tetraalkoxysilane as the source of silica the resultant alkali metal silicate solution is virtually free of other alkali metal ions. In preparing polysilicate solutions from $SiO_2$ there is inevitably obtained an alkali metal polysilicate having ions of other alkali metals. However, this problem is avoided when preparing the alkali metal polysilicate from a tetraalkoxysilane and a single alkali metal hydroxide solution. Thus, the compositions so prepared are so pure that the free alkali metal ion content, i.e., the content of alkali metal ions other than the ion of alkali metal oxide prepared, is less than 50 parts per million and, more especially, less than 10 parts per million, by weight.

When the above described process is utilized the above described disadvantages which characterize known processes are not encountered or they are encountered to only a negligible extent. Thus, the alkali polysilicate solutions prepared are virtually free of foreign ions normally found in such solutions. In addition, the process can be performed without great investment in apparatus or requires no special additional procedures. Specifically, it can be carried out in the absence of elevated pressure such as in the absence of autogenous pressure and it can be carried out without first comminuting the source of silica to an amorphous porous form.

DESCRIPTION OF PREFERRED EMBODIMENTS

The tetraalkoxysilane to be used as starting product is a compound which is easily prepared on a large technical scale, and which is obtained, for example, in accordance with German Pat. No. 1,793,222 by the reaction of silicon with the corresponding alcohol in the presence of the desired orthosilicic acid alkyl ester. In the present process the methyl ester, tetramethoxysilane, is used preferentially. However, esters whose alcohol component boils at up to about 100° C. under normal pressure may also be used. These include: Tetraethoxysilane, tetrapropoxysilane, ethoxytrimethoxysilane, diethoxydimethoxysilane, triethoxymethoxysilane, and tetra(t-butoxy)silane.

The alkali hydroxide is added, preferably in the form of an aqueous solution, to the tetraalkoxysilane, but the alkali hydroxide can also be added in solid form and then water can be added to the suspension. The amount of alkali hydroxide is governed by the desired molar ratio of $SiO_2$ to alkali hydroxide. The amount of water to be added, or the concentration of the alkali hydroxide solution, depends upon the desired solid content in the solution. The preferred molar ratio of $SiO_2$ to $Me_2O$ is to be from 4.5:1 to 4.8:1; accordingly, the preferred $SiO_2$ content is between 20 and 22% by weight.

An $SiO_2$ content greater than about 23 wt.percent cannot be obtained in the preparation of lithium polysilicates by the present method, because at concentrations above this level silicates of a composition that is not more precisely definable precipitate from the solution. Basically, however, one can also, by the present method, obtain solutions with an $SiO_2$ content under 16 wt.%, but such solutions are not of great technical or commercial importance.

If the amount of water used together with the alkali hydroxide is greater than corresponds to the desired solid content, the distillation of the alcohol that forms in the reaction is performed in such a manner that the excess water will distill out simultaneously or immediately after the distillation of the alcohol.

If, however, the amount of water used together with the alkali hydroxide corresponds approximately to the desired solid content or is less than that amount, then the necessary amount of water must be added optionally during or directly after the distillation of the alcohol.

In the practical performance of the present process the procedure is preferably to add the alkali hydroxide solution portion-wise to the tetraalkoxysilane. The reaction is highly exothermic, so that the alcohol that initially forms comes to a boil, especially when tetramethoxysilane is used. When the violence of the reaction abates, the alkali hydroxide solution can be added more rapidly. A viscous suspension remains in the stirrer-equipped vessel when the addition of the alkali hydroxide stops.

This suspension is heated and then the distillation of the alcohol is started. When sodium or potassium polysilicate solutions are being prepared, the content of the flask appears fluid, but by the time the alcohol has been distilled out at 90° C. a clear but very viscous solution remains. The corresponding lithium polysilicate is insoluble at the corresponding temperatures. It is not until after the cooling, which must take place with stirring, does a nearly clear, slightly viscous lithium polysilicate solution form from the thick-flowing suspension at temperatures around 50° C.

The alcohol must be separated as completely as possible; the more alcohol remains in the desired polysilicate solution the more turbid the solution will be. It is therefore recommendable to distill the alcohol down to a residual content of 2% by weight, but preferably less than 1 weight percent.

The water that passes over during the distillation of the alcohol is reintroduced to the flask, if necessary, upon termination of the distillation. However, a distillation column can be used to separate the alcohol in almost pure form, so that no appreciable amounts of water emerge from the apparatus. The water content in the reaction can in this manner be kept virtually constant. It is important, however, especially in the production of lithium polysilicate solutions, that the water needed in order to achieve the desired solid content be added to the suspension while it is still hot.

One can also add the tetraalkoxysilane to an alkali hydroxide solution, or to pour both reactants simultaneously into a flask. The rest of the process is then performed in the manner described above.

By the present method sodium and potassium polysilicate solutions can also be prepared whose molar ratio of $SiO_2$ to $Na_2O$ (or $K_2O$) is above 5.5:1. These solutions, however, will then have a solid content of less than 16 weight percent $SiO_2$. If it is attempted to increase the solid content, one obtains at room temperature a highly viscous to solid mass which again becomes a fluid upon the addition of water.

The present process is especially suitable for the production of lithium polysilicate solutions in the above-stated molar ratio. Such lithium polysilicate solutions, especially those in which the molar ratio of $SiO_2$ to $Li_2O$ is between 4.2:1 and 4.8:1, are particularly well suited as binding agents for zinc-rich pigments and coatings which are known by the general name of zinc dust colors.

In the preparation of lithium polysilicate solutions using tetramethoxysilane, it is also possible to add an inorganic or organic, acidly reacting compound and water to the tetramethoxysilane prior to the addition of the lithium hydroxide solution, and then to add the lithium hydroxide solution.

Furthermore, the alkali polysilicate solutions obtainable by the present method serve for the flameproofing of paper and wood and for the impregnation of wood to protect it from rot or insect pests such as wood borers, for example.

In order to more fully illustrate the nature of the invention and the manner of practicing the same, the following examples are presented:

EXAMPLE 1

88.6 kg. of a 90% solution of tetramethoxysilane in methanol is placed in a stirrer-equipped vat having a capacity of 450 liters.

A solution of 9.3 kg. of $LiOH . H_2O$ in 180 kg. of water is fed into the vat; the first 30 kg. thereof are added slowly on account of the violent reaction that takes place at the beginning. Then the solution is heated and the methanol, later mixed with amount of water, is distilled out at a head temperature of up to 98° C. 137 kg. of distillate with a water content of about 41% is taken out. 9.7 kg. of water is then added to the viscous suspension in the vat while it is still hot, and then the mixture is cooled with stirring down to room temperature, resulting in an only slightly turbid solution. In the refining filtration that follows this solution is freed of suspended substances. It contains 19.4% $SiO_2$ and 2.11% $Li_2O$, which corresponds to a molar ratio of $SiO_2$ to $Li_2O$ of about 4.6. The $OCH_3$ group content of the solution is less than 2%.

EXAMPLE 2

To a quantity of 798 g. of tetramethoxysilane in a laboratory mixer, a solution of 90.6 g. of $LiOH . H_2O$ in 1307 g. of water is delivered, cautiously at first, and more rapidly thereafter. The methanol that forms is separated relatively cleanly by means of a column, the distillate being removed up to a head temperature of up to 98° C. The small amount of water than has passed over by the end of the distillation is added to the still hot suspension in the mixer. Then the suspension is cooled down to room temperature with continued stirring. As cooling progresses the content of the flask becomes increasingly clear. After the final filtration 1426 g. of lithium polysilicate solution is obtained. Analysis shows 19.7% $SiO_2$ and 2.04% $Li_2O$, corresponding to a molar ratio of $SiO_2$ to $Li_2O$ of 4.7. The $OCH_3$ content is approximately 0.15%.

EXAMPLE 3

798 g. of $Si(OCH_3)_4$ are placed in a laboratory mixer. 92.7 g. of $LiOH . H_2O$ in solid form is added. Then water is added slowly with stirring. A vigorous reaction takes place, which slowly abates as the addition of water continues. The dough-like mass that in the meantime forms in the mixer, and which is difficult to stir, then becomes "more fluid" and easier to stir. The methanol is then immediately removed at head temperatures up to 98° C. After the addition of the amount of water that had passed over with the methanol, the cooling was continued, with stirring. A turbid, viscous solution was obtained, whose analysis showed a content of 20.4 weight percent $SiO_2$, 2.1 weight percent $Li_2O$ and 1.5 weight percent $OCH_3$ groups. The molar ratio of $SiO_2$ to $Li_2O$ accordingly amounted to 4.85:1.

EXAMPLE 4

To a quantity of 1092 g. of tetraethoxysilane placed in the laboratory mixer there is added a solution of 90.6 g. $LiOH . H_2O$ in 1307 g. of water. The solution does not have to be fed so very slowly, since the reaction is less vigorous than it is in the case of $Si(OCH_3)_4$. When the addition of the lithium hydroxide solution is completed, a thick suspension remains in the mixer. The ethanol that forms is removed through a column and the water that passes over with it is put back into the sump. After the reaction solution has been cooled with steady stirring, a liquid clouded by a precipitate forms, and the precipitate is removed by filtration.

Analysis of the filtered solution: $SiO_2$ = 19.1%, $Li_2O$ = 1.9%; $OC_2H_5$ content = 1.1%. The molar ratio of $SiO_2$ to $Li_2O$ is 5.1:1.

EXAMPLE 5

To 798 g. of tetramethoxysilane in a laboratory mixer there is added gradually 127 g. of KOH (tech. 88.5%) in 1270 g. of water. The reaction is less violent in comparison to the reaction with lithium hydroxide, but the boiling point of the methanol that forms is reached. At first a dough-like mass again forms in the mixing vessel. Then the methanol is distilled out and the water that passes over with it is readded to the content of the mixer. At about 95° C. a clear solution is obtained, which becomes increasingly viscous upon cooling. After standing overnight it became a solid, homogeneous mass which was restored to the liquid state by the addition of about 200 ml. of water, and could then be thoroughly filtered. Analysis: $SiO_2$ = 16.4%, $K_2O$ = 5.2%, $OCH_3$ content = 0.3%; $SiO_2:K_2O$ = 4.9:1.

What is claimed is:

1. A stable aqueous lithium polysilicate solution of a lithium polysilicate, said solution containing alkoxy groups of 1 to 3 carbon atoms, said solution having less than 50 parts per million of sodium or potassium ions wherein the mol ratio of silica to lithium oxide is 4–5:1, the $SiO_2$ content of said solution is between 20 and 22 percent by weight, said stable aqueous lithium polysilicate solution prepared by a process consisting essentially of contacting a tetraalkoxysilane of the formula $Si(OR)_4$ wherein each R is independently a straight or branched-chain alkyl group of 1 to 3 carbon atoms with an agent consisting essentially of an aqueous lithium hydroxide solution at a temperature between room temperature and the boiling point of the reaction mixture and at a temperature up to 100° C., the ratio of silane to lithium hydroxide being such that the reaction product has a silica to lithium oxide mol ratio of 4–5:1, distilling over substantially all of the alcohol formed by the reaction of the silane with the lithium hydroxide down to a residual alkoxy group content of 0.15 to less than 2 weight percent and during or immediately following said distillation adding water to adjust the silica content of said solution to between 20 and 22 weight percent and cooling the resultant product with stirring.

2. An aqueous lithium polysilicate solution according to claim 1 wherein the alkoxy groups of the polysilicate are methoxy groups and the methoxy group content of the solution is less than 2 percent by weight.

3. An aqueous lithium polysilicate solution according to claim 1 wherein the alkoxy groups of the polysilicate are methoxy groups and the methoxy group content of the solution is 0.15 percent by weight.

4. An aqueous lithium polysilicate solution according to claim 1 wherein the alkoxy groups of the polysilicate are methoxy groups and the methoxy group content of the solution is about 1.5 percent by weight.

5. An aqueous lithium polysilicate solution according to claim 1 wherein the alkoxy groups of the polysilicate are ethoxy groups and the ethoxy group content of the solution is about 1.1 percent by weight.

* * * * *